United States Patent
Okamoto

(10) Patent No.: US 8,149,468 B2
(45) Date of Patent: Apr. 3, 2012

(54) IMAGE READING DEVICE

(75) Inventor: Hisanori Okamoto, Owariasahi (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 1057 days.

(21) Appl. No.: 12/046,583

(22) Filed: Mar. 12, 2008

(65) Prior Publication Data

US 2008/0225344 A1    Sep. 18, 2008

(30) Foreign Application Priority Data

Mar. 12, 2007  (JP) ................. 2007-061805

(51) Int. Cl.
*H04N 1/00* (2006.01)
*H04N 1/04* (2006.01)

(52) U.S. Cl. ........ 358/409; 358/445; 358/443; 358/468; 358/483; 358/482; 358/474

(58) Field of Classification Search .............. 358/445, 358/448, 468, 483, 482, 514, 443, 409, 474; 250/208.1, 234–236
See application file for complete search history.

(56) References Cited

U.S. PATENT DOCUMENTS

| | | | |
|---|---|---|---|
| 6,525,842 B1 | 2/2003 | Nakajima et al. | |
| 2003/0020936 A1 | 1/2003 | Nakajima et al. | |

FOREIGN PATENT DOCUMENTS

| | | | |
|---|---|---|---|
| JP | 10-065910 A | | 3/1998 |
| JP | 10-126595 A | | 5/1998 |
| JP | 2000-151936 A | | 5/2000 |
| JP | 2000-151942 A | | 5/2000 |
| JP | 2000151936 A | * | 5/2000 |
| JP | 2001-094734 A | | 4/2001 |
| JP | 2001-238043 | | 8/2001 |
| JP | 2002-033858 A | | 1/2002 |
| JP | 2003-110798 A | | 4/2003 |
| JP | 2006-222688 | | 8/2006 |
| JP | 2006-262073 | | 9/2006 |

OTHER PUBLICATIONS

JP Office Action dtd Jan. 27, 2009, JP App. 2007-061805.

* cited by examiner

*Primary Examiner* — Cheukfan Lee
(74) *Attorney, Agent, or Firm* — Banner & Witcoff, Ltd.

(57) ABSTRACT

An image reading device includes a reading unit and a controller connected to the reading unit through a transmission path. The controller includes: a first clock generator which generates a first reference clock; a second clock generator which generates a second reference clock; a line synchronizer which generates a line synchronization signal based on the first reference clock; a clock transmitter which transmits the line synchronization signal and a unit clock based on the first reference clock to the reading unit; and a processor which execute a process based on the second reference clock and which is synchronized with the line synchronization signal. The reading unit includes a reading sensor which reads a document line by line based on the unit clock and the line synchronization signal.

5 Claims, 8 Drawing Sheets

FIG. 7

| C [4] | DESCRIPTION |
|---|---|
| 0 | NOT BEGINNING OF LINE |
| 1 | BEGINNING OF LINE |

FIG. 8

| C [3:0] | DESCRIPTION |
|---|---|
| 0000 | DUMMY PIXELS |
| 0001 | RED ACTIVE PIXELS |
| 0010 | GREEN ACTIVE PIXELS |
| 0011 | BLUE ACTIVE PIXELS |
| 0110 | RED BLACK PIXELS |
| 0111 | GREEN BLACK PIXELS |
| 1000 | BLUE BLACK PIXELS |
| 1111 | BEGINNING OF SCAN |

IMAGE READING DEVICE

CROSS REFERENCE TO RELATED APPLICATION

The present disclosure relates to the subject matter contained in Japanese patent application No. 2007-061805 filed on Mar. 12, 2007, which is expressly incorporated herein by reference in its entirety.

TECHNICAL FIELD

The present invention relates to an image reading device.

BACKGROUND

FIG. 9 shows an example of an image reading device. The image reading device is configured such that a control board 100 is connected to a reading sensor 101, such as CCD, through a harness 102. The control board 100 has a clock generating circuit 103 to generate a reference clock generated. The reference clock is input to an ASIC 104 disposed on the control board 100. The ASIC 104 generates, based on the reference clock, a sensor driving signal that is used for controlling the read timing of the reading sensor 101, and transmits the generated sensor driving signal to the reading sensor 101 through the harness 102.

The reading sensor 101 reads a document line by line on the basis of the sensor driving signal, and transmits the acquired analog read image signal to an analog front end (AFE) 105 on the control board 100 through the harness 102. The AFE 105 A/D-converts the received read image signal on the basis of the clock signal input from the ASIC 104 to generate digital reading data, and transfers the reading data to the ASIC 104. The ASIC 104 executes various image processes on the reading data.

The image reading device employs a single reference clock, on the basis of which components operates for synchronization. However, in order to efficiently drive circuits for performing various system control operations, such as an image process on the reading data and a control process of the motor for moving the reading sensor relative to the document, it is required to use reference clocks suitable for system configurations or CPU characteristics. In order to reduce the electromagnetic interference (EMI), the use of a clock generating circuit (such as an SSCG) having a function of modulating the frequency of the reference clock is also considered.

In this connection, Japanese Patent Unexamined Publication No. 2001-238043 discloses an image reading device designed to reduce EMI noise. The image reading device includes a clock generator (6A) for generating a clock (15.0 MHz) for processing data of odd-line-numbered pixels and a clock generator (6B) for generating a clock (15.3 MHz) for processing data of even-line-numbered pixels. The clock of 15.3 MHz is supplied to the input side of a buffer (4), whereas the clock of 15.0 MHz is supplied to the output side of the buffer (4). Accordingly, data of even-numbered pixels are written in the buffer (4) at 15.3 MHz and read therefrom at 15.0 MHz so that data of odd-line-numbered pixels and data of even-line-numbered pixels are synchronized and supplied to a multiplexer (5). Because an A/D converter (3A) operates at 15.0 MHz for processing the odd-line-numbered pixel data and an A/D converter (3B) operates at 15.3 MHz for processing the even-line-numbered pixel data, EMI noise from the A/D converter (3A) and EMI noise from the A/D converter (3B) are not superimposed one on another. Accordingly, the image reading device can effectively reduce EMI noise generated therefrom.

On the other hand, the reading sensor is required to operate at a reference clock optimal for the characteristics thereof in order to increase reading speed thereof. However, it is difficult to obtain the optimal clock optimal based on a reference clock used in the system.

Even in the case of the image reading device disclosed in Japanese Patent Unexamined Publication No. 2001-238043, a CCD (2) operates based on 15.0 MHz to read pixels on an odd-numbered line and based on 15.3 Mhz to read pixels on an even-numbered line, and thus is bound to the clocks of the generators (3A,3B).

SUMMARY

An image reading device includes a reading unit and a controller connected to the reading unit through a transmission path. The controller includes: a first clock generator which generates a first reference clock; a second clock generator which generates a second reference clock; a line synchronizer which generates a line synchronization signal based on the first reference clock; a clock transmitter which transmits the line synchronization signal and a unit clock based on the first reference clock to the reading unit; and a processor which execute a process based on the second reference clock and which is synchronized with the line synchronization signal. The reading unit includes a reading sensor which reads a document line by line based on the unit clock and the line synchronization signal.

Accordingly, one of advantages of the invention is to enable the use of reference clocks respectively optimized for the reading sensor and the controller processor. Another one of the advantages is to enable synchronization between the reading sensor and the controller processor.

These and other advantages of the invention will be discussed in detail with reference to the accompanying drawings.

BRIEF DESCRIPTION OF THE DRAWINGS

Illustrative aspects of the invention will be described in detail with reference to the following figures wherein:

FIG. 7 is a diagram illustrating details of attribute data.

FIG. 8 is a diagram illustrating details of attribute data.

DESCRIPTION

Illustrative, non-limiting embodiments of the invention will be described with reference to FIGS. 1 to 8.

(Configuration of Multi-Function Device)

Figure 1:
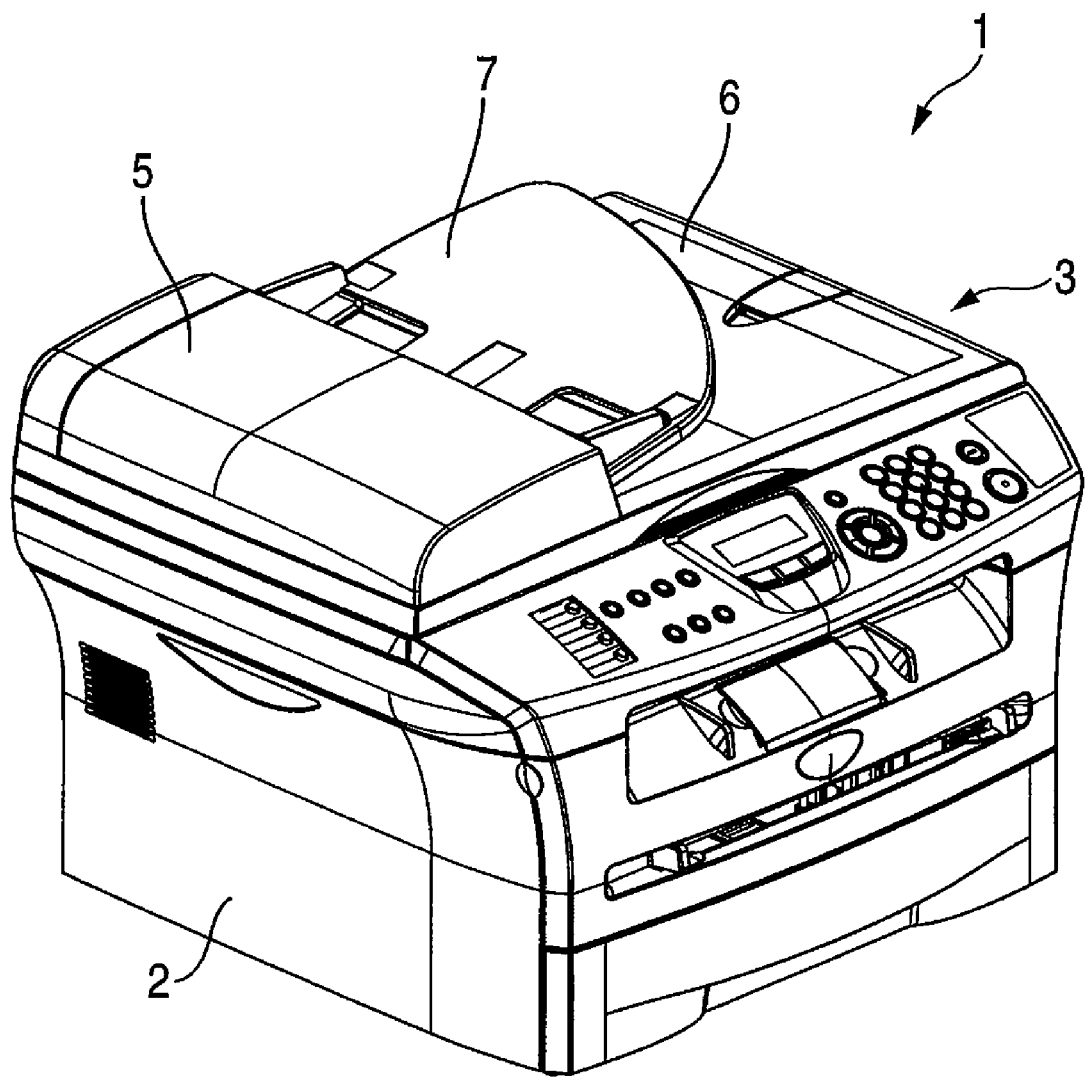
FIG. 1 is a perspective view illustrating an appearance of a multi-function device.
Figure 2:
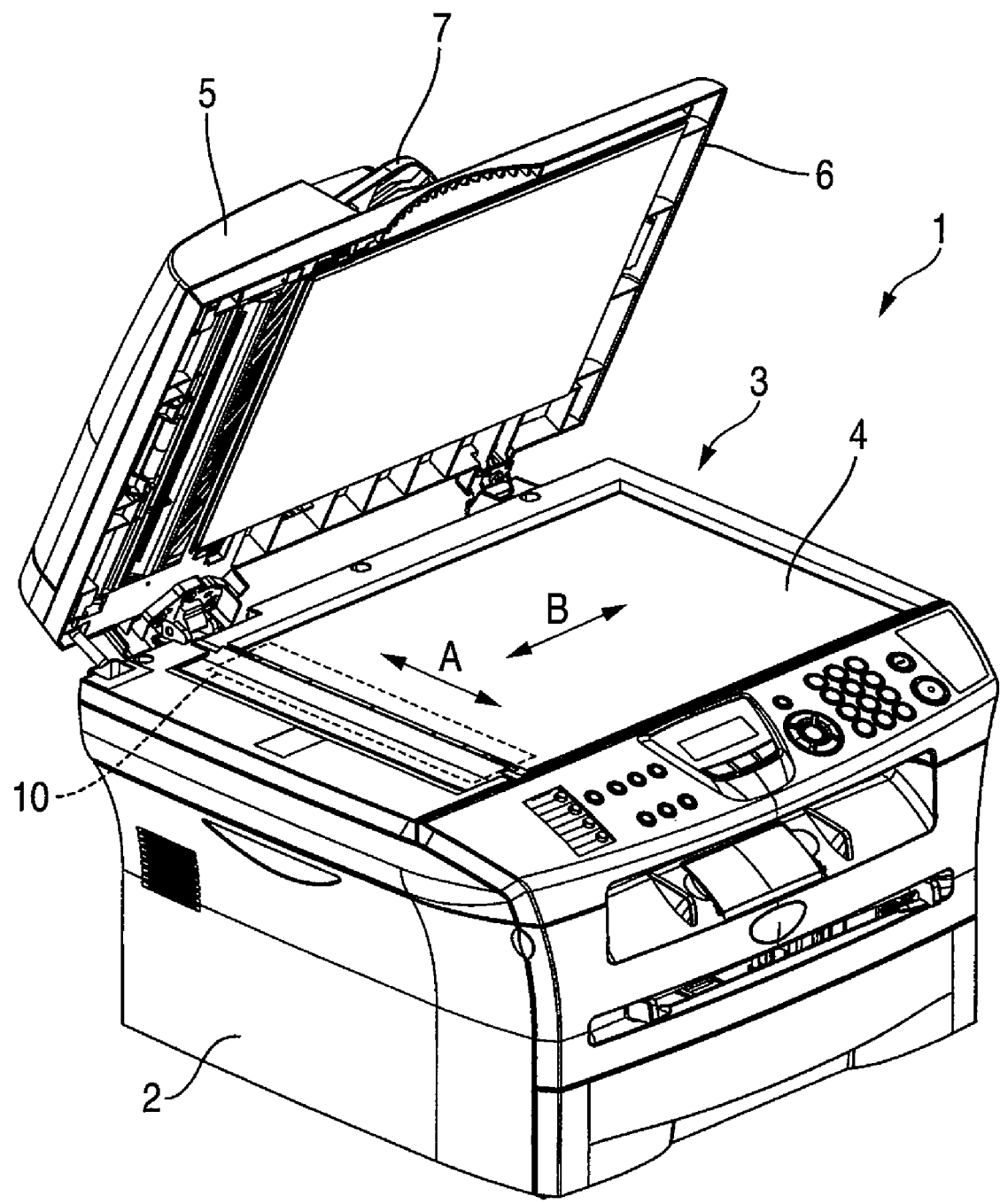
FIG. 2 is a perspective view illustrating the appearance of the multi-function device in a state where a document cover is opened.

FIGS. 1 to 8 show a multi-function device 1 (an example of an image reading device) having a scanner function, a printer function, a copier function, and a facsimile function. FIG. 1 is a perspective view illustrating an appearance of the multi-function device 1 and FIG. 2 is a perspective view illustrating an appearance of the multi-function device in a state where a document cover 6 is opened.

The multi-function device 1 includes a main body 2 having a printer unit (not shown) for printing an image on a sheet. The multi-function device 1 also includes a document reading unit 3, disposed on the main body 2, for reading a document. The document reading unit 3 includes a document mounting section 4 having a transparent glass plate, and a reading unit 10 having a reading sensor 22 to be described later. The reading unit 10 is disposed below the document mounting section 4. The top surface of the document mounting section 4 is covered with a document cover 6 having an ADF (Auto Document Feeder) 5 so as to be openable. The ADF 5 includes a document tray 7 on which plural sheets of documents can be stacked, and conveys the documents placed on the document tray 7 to a reading position sheet by sheet.

A document can be read in a state where the document is placed on the document mounting section 4 and in a state where the document is set on the ADF 5. In the former, the reading unit 10 moves in a sub scanning direction (see arrow B in FIG. 2) by means of the power of a motor 13 (see FIG. 3) while the document on the document mounting section 4 is read line by line in a main scanning direction (see arrow A) by the reading sensor 22. In the latter, after the reading unit 10 is fixed to the left end position of the document mounting section 4, the document is conveyed by means of the driving of the ADF 5 to a reading position at which the reading sensor 22 read the document line by line in the main scanning direction.

(Image Reading System)

Figure 3:
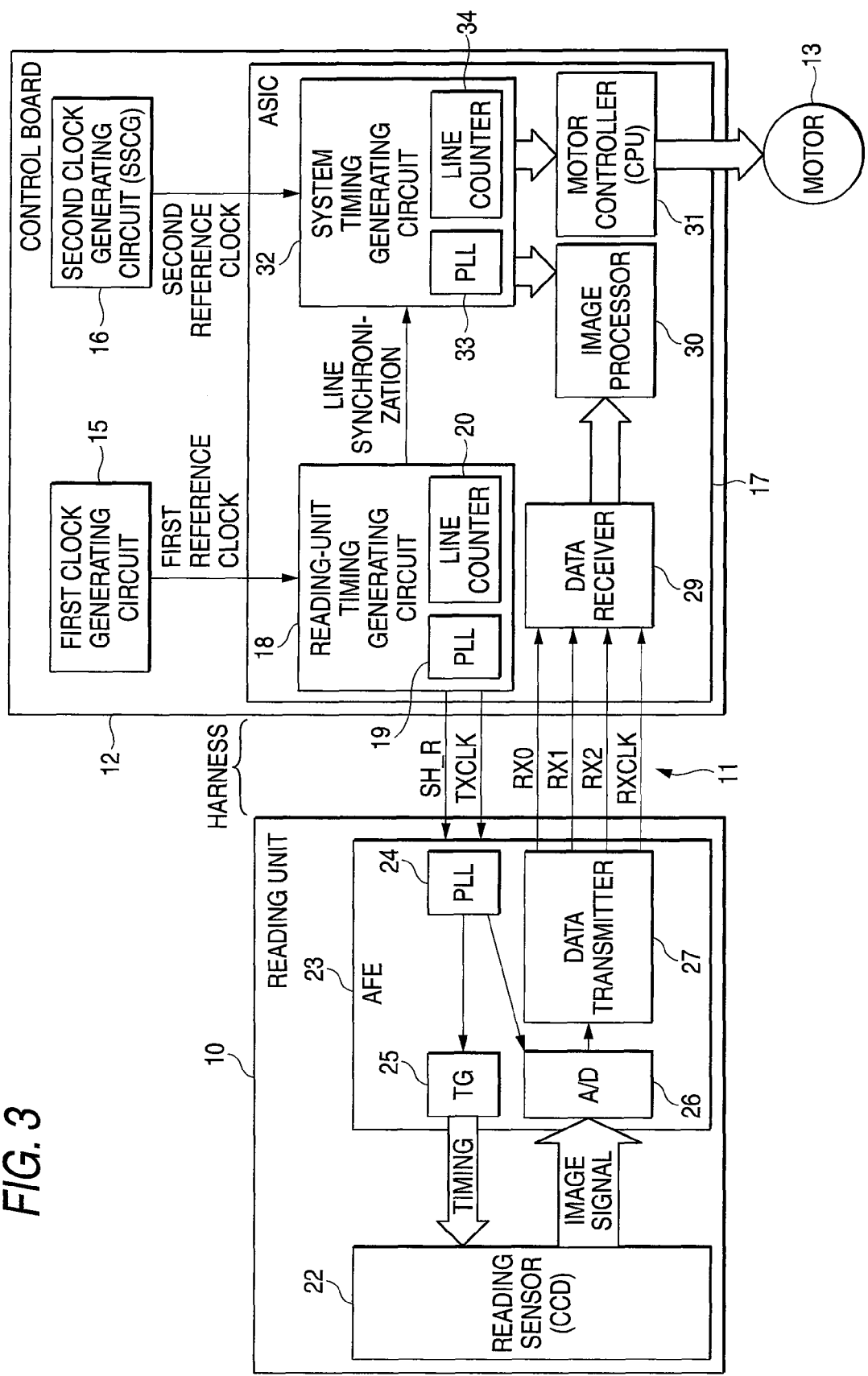
FIG. 3 is a block diagram illustrating a configuration of an image reading system in the multi-function device.
Figure 4:
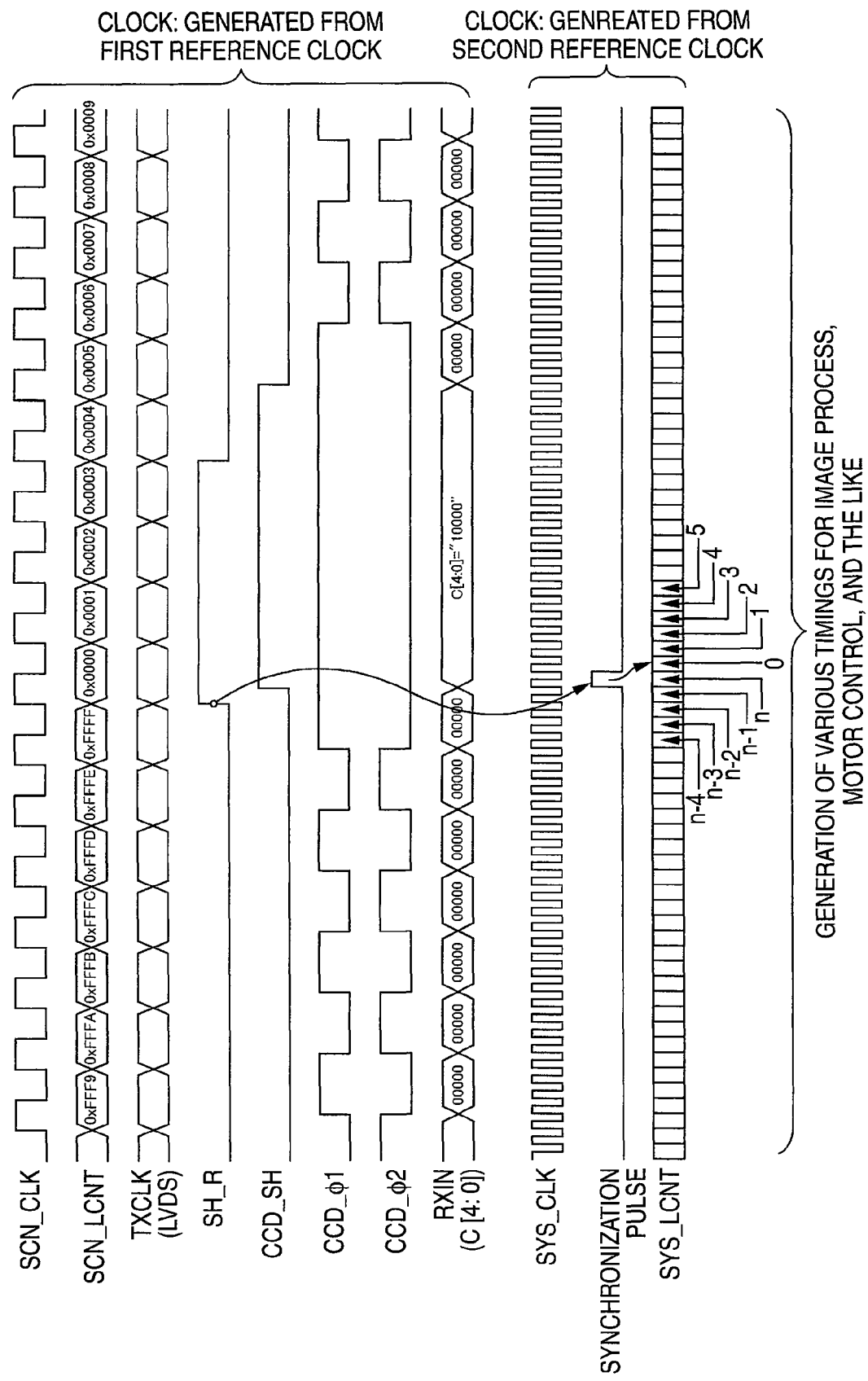
FIG. 4 is a timing diagram illustrating relations between various signals in the image reading system.

FIG. 3 is a block diagram illustrating a configuration of an image reading system in the multi-function device 1 and FIG. 4 is a timing diagram illustrating relations of various signals in the image reading system. The image reading system includes a reading unit 10, a control board 12 (an example of a controller) connected to the reading unit 10 through a harness 11 (an example of a transmission path), and a motor 13 (an example of a moving mechanism) for moving the reading unit 10. The control board 12 may be connected to the reading unit 10 through wireless communication.

A first clock generating circuit 15 (an example of a first clock generator) and a second clock generating circuit 16 (an example of a second clock generator) are provided on the control board 12 for generating reference clocks, on the basis of which the image reading system and the like operates. Each of the clock generating circuits 15 and 16 is constructed as an oscillation circuit using vibrations of a crystal oscillator. The first clock generating circuit 15 outputs a first reference clock having a constant frequency, but the second clock generating circuit 16 such as an SSCG (Spread Spectrum Clock Generator) outputs a second reference clock having a modulated frequency.

An ASIC (Application Specific IC) 17 having a function of controlling operations of the reading unit 10 and the motor 13 is provided on the control board 12. The ASIC 17 includes a reading-unit timing generating circuit 18 (an example of a clock transmitter and a line synchronizer) to which the first reference clock is input. The reading-unit timing generating circuit 18 includes a PLL (Phase-Locked Loop) 19, and the PLL 19 generates a clock signal (SCN_CLK) phase-synchronized with the first reference clock. The reading-unit timing generating circuit 18 includes a low voltage differential signaling (LVDS) transmission circuit (not shown) and transmits a unit clock (TXCLK) phase-synchronized with the clock signal (SCN_CLK) generated by the PLL 19 as the LVDS signal to the reading unit 10, as shown in FIG. 4.

The reading-unit timing generating circuit 18 includes a line counter 20 for measuring a time required to read and process data on one line. The line counter 20 counts in synchronization with the clock signal (SCN_CLK) generated by the PLL 19. In the example shown in FIG. 4, the line counter 20 counts from "0x0000" to "0xFFFF" as one counting cycle and repeats this counting cycle, and every timing at which the line counter 20 ends one counting cycle, the reading-unit timing generating circuit 18 generates a line synchronization signal (SH_R) synchronized with that timing, and transmits the line synchronization signal to the reading unit 10. Since the line synchronization signal (SH_R) is lower in frequency than the clock signal (SCN_CLK), the line synchronization signal can be transmitted through one signal line or may be transmitted by the LVDS technology. The line synchronization signal is also output to a system timing generating circuit 32 to be described later.

On the other hand, the reading unit 10 includes a reading sensor 22 (an example of a reading sensor) and an analog front end (AFE) 23. The AFE 23 includes a PLL 24 (an example of a timing generator). The PLL 24 generates and outputs a clock signal on the basis of the unit clock (TXCLK) transmitted from the reading-unit timing generating circuit 18 of the control board 12. This clock signal is used in elements of the AFE 23 such as a timing generator 25, an A/D converter 26, and a data transmitter 27, which are all described later.

The timing generator 25 (an example of a timing generator) generates various driving timing signals (such as CCD_SH, CCD_Φ1, and CCD_Φ2 shown in FIG. 4) for driving the reading sensor 22 on the basis of the clock signal output from the PLL 24 and the line synchronization signal (SH_R) transmitted from the reading-unit timing generating circuit 18, and outputs the generated driving timing signals to the reading sensor 22. Various clock signals and timing signals generated from the PLL 24 and the timing generator 25, including these driving timing signals, are delayed from a timing at which the reading-unit timing generating circuit 18 generates the unit clock (TXCLK) and the line synchronization signal (SH_R), due to an influence of the length of the transmission path such as the harness 11. However, since the reading sensor 22 is controlled by various driving timing signals generated by the timing generator 25, the delay does not cause a problem. Since the unit clock (TXCLK) input to the PLL 24 and the line synchronization signal (SH_R) input to the timing generator 25 are influenced to the same extent by the length of the transmission path such as the harness 11, the unit clock (TXCLK) and the line synchronization signal (SH_R) are substantially equal to each other in the amount of delay, and thus give no adverse influence to the control of the reading unit 10.

The reading sensor 22 which employs, for example, a CCD (Charge Coupled Device) includes photodiodes arrayed in a line. The reading sensor 22 is configured to receive the reflected light, generated from a light source to a document and reflected from the document, by the use of photodiodes and to convert the light intensity (brightness) of each pixel into electrical signal. The reading sensor 22 reads the document on the basis of the driving timing signals (such as CCD_SH, CCD_Φ1, and CCD_Φ2) from the timing generator 25 and outputs the acquired electrical signals (read image signals) to the A/D converter 26 of the AFE 23.

The A/D converter 26 quantizes the analog read image signals output from the reading sensor 22 and transfers the acquired pixel data to the data transmitter 27 (where the A/D converter 26 and the data transmitter 27 are an example of a data transmitter). The data transmitter 27 generates reading data obtained by adding attribute data to the pixel data as described below, and transmits the reading data to a data receiver 29 disposed in the ASIC 17 along with a data synchronization signal synchronized with the clock signal (transmission timing signal) from the PLL 24.

Figure 5:
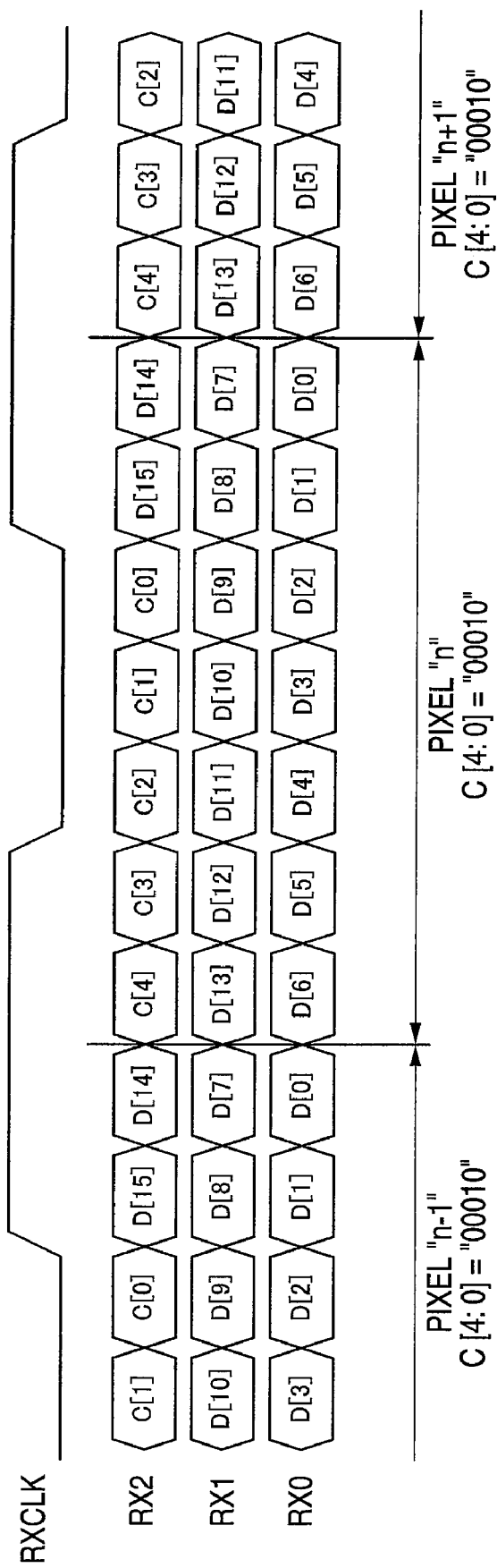
FIG. 5 is a diagram illustrating details of monochromatic reading data.
Figure 6:
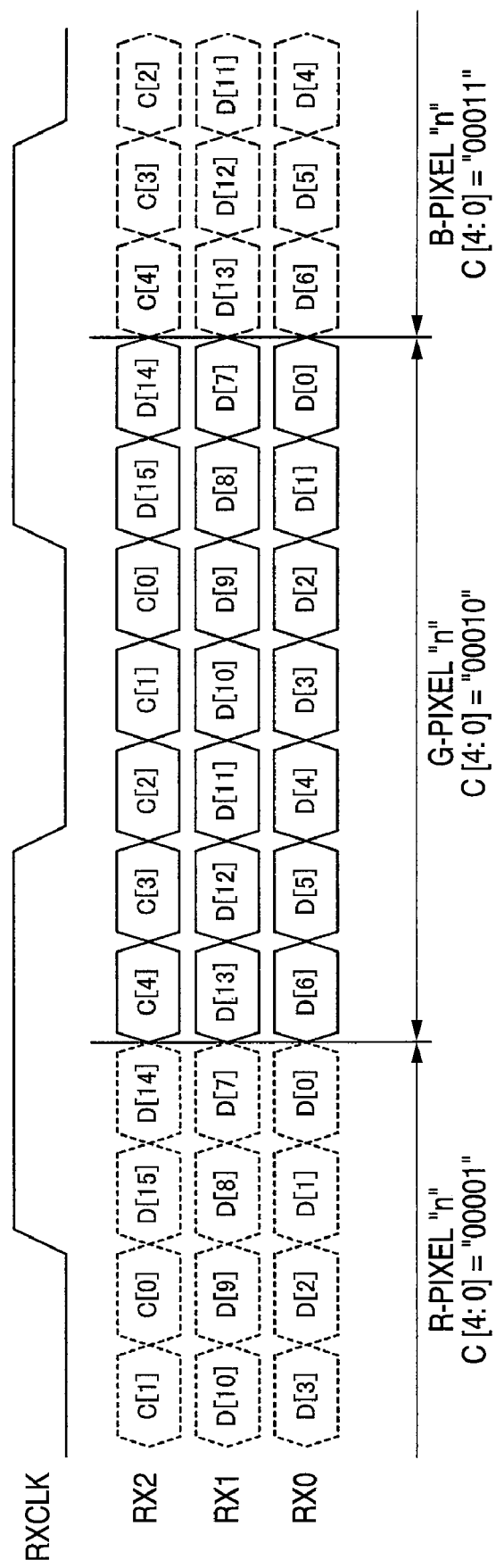
FIG. 6 is a diagram illustrating details of color (RGB) reading data.
Figure 9:
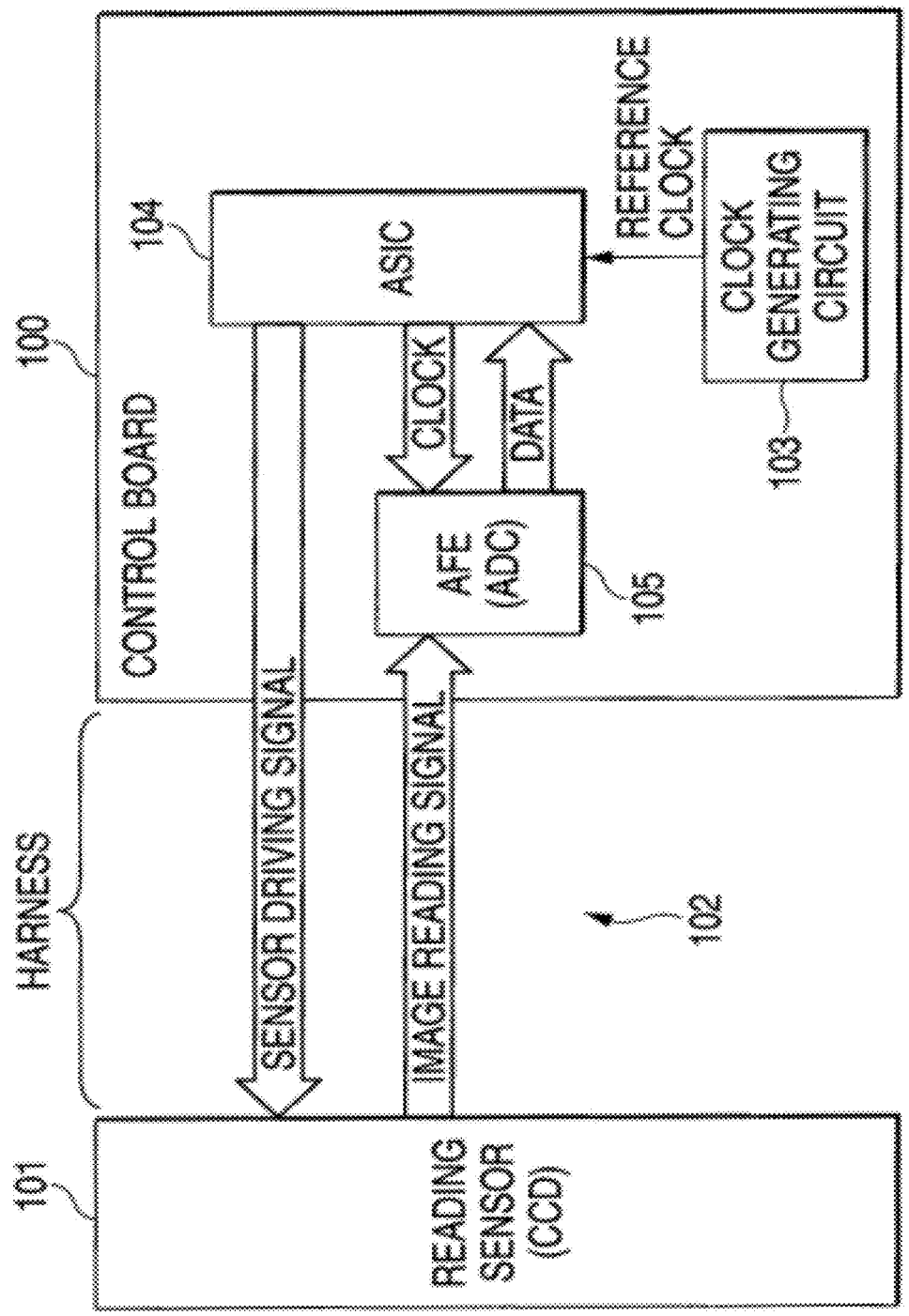
FIG. 9 is a block diagram illustrating a configuration of an image reading device of the background art.

FIG. 5 is a diagram illustrating details of monochromatic reading data, and FIG. 6 is a diagram illustrating details of color (RGB) reading data. The data transmitter 27 outputs the data synchronization signal as an LVDS signal (RXCLK) of one channel and outputs the reading data as LVDS signals (RX0, RX1, and RX2) of three channels. The reading data are transmitted by 21 bits in total, 7 bits per channel in one cycle of the data synchronization signal. As shown in FIG. 5, the monochromatic reading data includes 16-bit pixel data (gray scale data: D[0]~D[15]) and 5-bit attribute data (C[0]~C[4]) per pixel, and the pixel data and attribute data of one pixel are transmitted in one cycle of the data synchronization signal. As shown in FIG. 6, the color reading data are formulated such that 16-bit pixel data (D[0]~D[15]) and 5-bit attribute data (C[0]~C[4]) are included for each of RGB elements of one pixel (R-Pixel "n", G-Pixel "n", B-Pixel "n") and the pixel data and attribute data of one of RGB element are transmitted in one cycle of the data synchronization signal. The color reading data are continuously transmitted in a predetermined order of colors, like R element, G element, and B element of pixel "n", R element, G element, and B element of pixel "n+1", and so on.

FIGS. 7 and 8 are diagrams illustrating details of the attribute data. The attribute data are added to the pixel data to represent the attribute thereof. As shown in FIG. 7, 1 bit (C[4]) of the 5-bit attribute data indicates whether the pixel data is head data of one line ("1") or not ("0"). As shown in FIG. 8, the other 4 bits (C[3:0]) of the attribute data indicates whether the pixel data is ineffective pixel data ("0000") at both ends of the line, effective pixel data ("0001", 0010", "0011") of the RGB colors, black reference data ("0110", 0111", "1000") of the RGB colors, or reading-start-position data ("1111"). The attribute data (C[4:0]) indicating that the pixel data is monochromatic effective pixel data is constant value such as "00010."

The data receiver 29 (an example of a data receiver) controls the reception of the reading data on the basis of the data synchronization signal. That is, the data receiver 29 includes a PLL (not shown) for generating various clock signals on the basis of the data synchronization signal (RXCLK) and divides the received reading data in the unit of 1 bit every channel on the basis of a clock signal obtained by multiplying seven times the frequency of the data synchronization signal (RXCLK). FIG. 4 shows an example of the attribute data (C[4:0]) of the reading data (RXIN) received by the data receiver 29. As shown in FIG. 4, the attribute data at a start position (beginning) of one line has a value of "10000" and the pixel data before and after it, that is, the attribute data at both ends of the line have a value of "00000" which indicates ineffective pixel data. The data receiver 29 sequentially outputs the attribute data and pixel data of the pixels (elements) received at the timing based on the data synchronization signal (RXCLK) to an image processor 30 to be described later. Since the data synchronization signal (RXCLK) and the reading data (RX0, RX1, RX2) received by the data receiver 29 are delayed due to an influence of the length of the transmission path such as harness 11 but are delayed to the same extent, the delay does not have an adverse influence on the operation of the data receiver 29.

The ASIC 17 includes an image processor 30 for performing an image process, a motor controller 31 for controlling the motor 13, and a system timing generating circuit 32 for generating various timings. The system timing generating circuit 32 includes a PLL 33, and the PLL 33 generates a system clock (SYS_CLK) phase-synchronized with the second reference clock output from the second clock generating circuit 16.

The system timing generating circuit 32 includes a line counter 34 for measuring a time required to read and process data on one line. As shown in FIG. 4, the line counter 34 counts in synchronization with the system clock (SYS_CLK) generated by the PLL 33. As shown also in FIG. 4, the system timing generating circuit 32 generates a line synchronization pulse at a timing based on a timing at which the system timing generating circuit 32 receives the line synchronization signal (SH_R) from the reading-unit timing generating circuit 18. The line counter 34 sets the count value to 0 on the basis of the line synchronization pulse (see SYS_LCNT in FIG. 4).

The system timing generating circuit 32 generates and outputs various timing signals used in the image processor 30, the motor controller 31, and the other elements on the basis of the system clock (SYS_CLK), the line synchronization pulse, and the line counter 34.

The image processor 30 (an example of a processor) stores the pixel data output from the data receiver 29 in a line buffer color-by-color and performs a two-dimensional image process such as various correction processes and filter processes on the pixel data, on the basis of the timing signal output from the system timing generating circuit 32. The image processor 30 sequentially stores the acquired image data in a RAM (not shown) provided on the control board 12.

The motor controller 31 (an example of the processor and a movement controller) is embodied by the CPU included in the ASIC 17. The CPU generates and outputs a motor driving signal to the motor 13 on the basis of the line synchronization pulse and the system clock (SYS_CLK) output the system timing generating circuit 32, thereby moving the reading unit 10 for reading a document. The motor controller 31 serves to control the motor 13 for moving the reading unit 10 relative to the document, but may serve to control the ADF 5 or the like for moving the document relative to the reading unit 10.

Advantages of the Embodiment

As described above, according to the embodiment, since the reading sensor 22 of the reading unit 10 and the processor such as the image processor 30 and the motor controller 31 of the control board 12 operate on the basis of different reference clocks, optimal reference clocks can be used. Accordingly, it is possible to accomplish an increase in reading speed, suppression of electromagnetic interference (EMI), and the like. In addition, it is possible to synchronize the reading sensor 22 and the processor such as the image processor 30 with each other in a line-by-line basis by the use of the line synchronization signal generated by the reading-unit timing generating circuit 18.

The read image signal output from the reading sensor 22 is quantized by the reading unit 10 and the digital reading data is transmitted to the control board 12 through the transmission path such as the harness 11. Accordingly, it is possible to transmit and receive data at high speed while securing data quality, compared with a case where an analog image signal is transmitted and received through the transmission path.

If the reading sensor driving signal is transmitted to the reading unit through the transmission path such as a harness from the control board, the reading sensor driving signal would be deteriorated in signal quality due to an influence of the length of the transmission path. On the contrary, according to the embodiment, since the PLL 24 or the timing generator 25, serving as the timing generator, is provided in the reading unit 10 to generate a signal for controlling the driving timing of the reading sensor 22 or the transmission timing of the reading data from the data transmitter 27, the quality of the signal transmitted to the reading sensor 22 and the like is guaranteed, thereby accomplishing an increase in reading speed.

If the data receiver 29 controls the reception of data on the basis of a clock supplied directly from an element of the control board 12, a timing difference would occur between the directly supplied clock and the reading data received through the harness 11, hindering high-precision communication. On the contrary, according to the embodiment, since the data synchronization signal (RXCLK) based on the clock signal (transmission timing signal) generated from the PLL 24 of the reading unit 10 is transmitted along with the reading data, and the data receiver 29 controls the reception thereof on the basis of the data synchronization signal, the timing difference between the reading data and the data synchronization signal is very small, thereby enabling high-speed and high-precision communication.

To perform the image process or control the motor 13 for moving the reading sensor 22 on the basis of the second reference clock, the line synchronization signal enables the line synchronization.

By modulating the frequency of the second reference clock, it is possible to decrease the peak value of the frequency spectrum and thus to reduce the electromagnetic interference (EMI).

The invention is not limited to the embodiment described with reference to the drawings, and may be embodied in various ways. For example, the following modifications may be applied without departing from the sprit and scope of the invention.

Although the invention is applied to a multi-function device in the above-mentioned embodiment, the invention may be applied to an image reading device not having a printer function, a copier function, and a facsimile function as long as it has a reading function.

Although the frequency of the second reference clock is modulated by the SSCG in the above-mentioned embodiment, the frequency may be modulated by means other than the SSCG or the frequency of the second reference clock may not be modulated. As described above, the invention can provide the following illustrative, non-limiting embodiments.

(1) An image reading device including a reading unit and a controller connected to the reading unit through a transmission path, wherein the controller includes: first clock generating means for generating a first reference clock; second clock generating means for generating a second reference clock; line synchronization means for generating a line synchronization signal based on the first reference clock; clock transmitting means for transmitting a unit clock based on the first reference clock and the line synchronization signal to the reading unit; and processing means for performing a process based on the second reference clock, the processing means being synchronized with the line synchronization signal, and wherein the reading unit includes a reading sensor for reading a document line by line based on the unit clock and the line synchronization signal.

(2) The image reading device according to (1), wherein the reading unit includes data transmitting means for transmitting, to the controller, reading data obtained by quantizing read image signal output from the reading sensor based on the unit clock.

(3) The image reading device according to (2), wherein the reading unit includes timing generating means for generating a driving timing signal for driving the reading sensor and a transmission timing signal for controlling the transmission timing of the reading data from the data transmitting means based on the unit clock.

(4) The image reading device according to (3), wherein the data transmitting means transmits the reading data and a data synchronization signal to the controller based on the transmission timing signal, and wherein the controller includes data receiving means for controlling the reception of the reading data based on the data synchronization signal.

(5) The image reading device according to any one of (1) to (4), wherein the processing means includes an image processor for image-processing the reading data received by the data receiving means.

(6) The image reading device according to any one of (1) to (5), further comprising moving means for relatively moving the reading unit and the document, wherein the processing means includes movement control means for controlling the driving of the moving means.

(7) The image reading device according to any one of (1) to (6), wherein the second clock generating means modulates the frequency of the second reference clock.

In a case of the device of (1), since the reading sensor of the reading unit and the processing means of the controller operate based on different reference clocks, optimal reference clocks can be used. Accordingly, it is possible to accomplish an increase in reading speed, suppression of electromagnetic interference, and the like. In addition, it is possible to synchronize the reading sensor and the processing means of the controller with each other a line-by-line basis by the use of the line synchronization signal generated by the line synchronization means.

In a case of the device (2), the read image signal output from the reading sensor is quantized by the reading unit and the digital reading data is transmitted to the controller through the transmission path such as a harness. Accordingly, it is possible to transmit and receive data at high speed while securing data quality, compared with a case in which an analog image signal is transmitted and received through the transmission path.

If the reading sensor driving signal is transmitted to the reading unit through the transmission path such as a harness from the controller, the signal would be deteriorated in signal quality due to an influence of the length of the transmission path. On the contrary, in a case of the device (3), since the timing generating means is provided in the reading unit and thus generates a signal for controlling the driving timing of the reading sensor or the transmission timing of the reading data, the quality of the signal transmitted to the reading sensor and the like is guaranteed, thereby accomplishing an increase in reading speed.

If the receiving means for receiving the reading data controls the data reception based on a clock supplied directly from an element of the controller, a timing difference would occur between the directly supplied clock and the reading data received through the transmission path, hindering high-precision communication. On the contrary, in the case of the device (4), since the data synchronization signal based on the transmission timing signal generated from the timing generating means of the reading unit is transmitted along with the reading data, and the receiving means controls the reception thereof based on the data synchronization signal, the timing difference from the reading data is very small, thereby enabling high-speed and high-precision communication.

In a case of the devices of (5) and (6), when the image process is executed or the moving means for moving the reading sensor is controlled based on the second reference clock, the line synchronization can be secured by the use of the line synchronization signal.

In a case of the device (7), by modulating the frequency the second reference clock, it is possible to reduce the electromagnetic interference (EMI).

What is claimed is:

1. An image reading device comprising:
    a reading unit; and
    a controller connected to the reading unit through a transmission path,
    wherein the controller includes:
        a first clock generator which generates a first reference clock;
        a second clock generator which generates a second reference clock;
        a line synchronizer which generates a line synchronization signal based on the first reference clock;
        a clock transmitter which transmits the line synchronization signal and a unit clock based on the first reference clock to the reading unit; and
        a processor which execute a process based on the second reference clock and which is synchronized with the line synchronization signal, and
    wherein the reading unit includes:
        a reading sensor which reads a document line by line based on the unit clock and the line synchronization signal,
        a data transmitter which transmits, to the controller, reading data obtained by quantizing a read image signal output from the reading sensor based on the unit clock, and
        a timing generator which generates, based on the unit clock, a driving timing signal used for driving the reading sensor and a transmission timing signal used for controlling the transmission timing of the reading data from the data transmitter.

2. The image reading device according to claim 1, wherein the data transmitter transmits the reading data and a data synchronization signal to the controller based on the transmission timing signal, and
    wherein the controller includes a data receiver which controls reception of the reading data based on the data synchronization signal.

3. The image reading device according to claim 2, wherein the processor includes an image processor which image-processes the reading data received by the data receiver.

4. The image reading device according to claim 1, further comprising a moving mechanism which moves one of the reading unit and the document relative to the other,
    wherein the processor includes a movement controller which controls the moving mechanism.

5. The image reading device according to claim 1, wherein the second clock generator modulates frequency of the second reference clock.

* * * * *